J. J. BERRIGAN.
LIQUID SEPARATOR.
APPLICATION FILED NOV. 30, 1912.
1,087,568.
Patented Feb. 17, 1914.
2 SHEETS—SHEET 1.
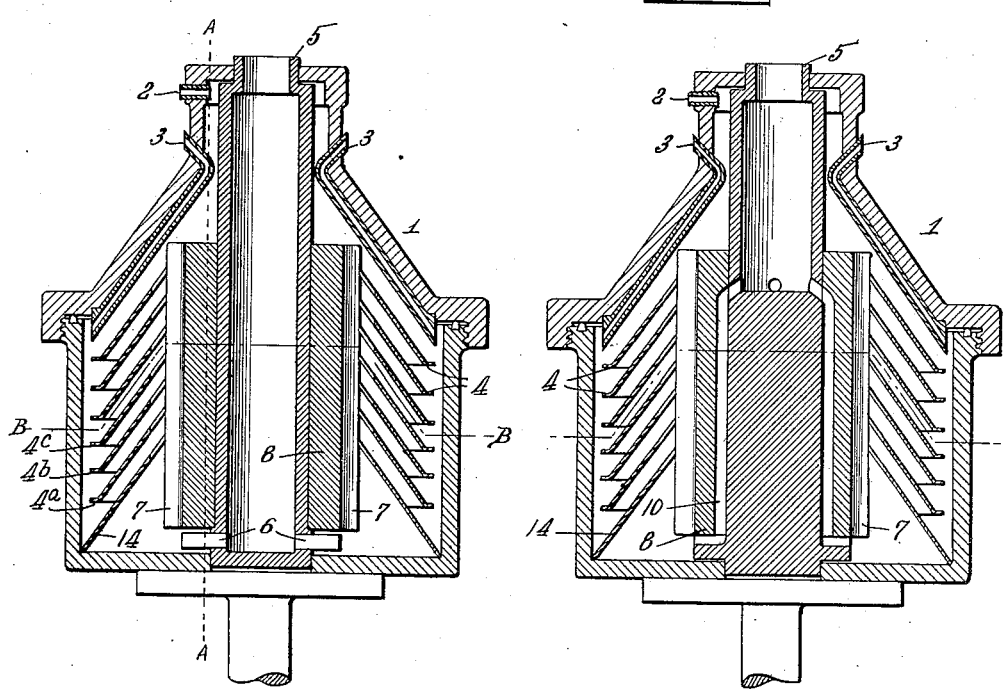
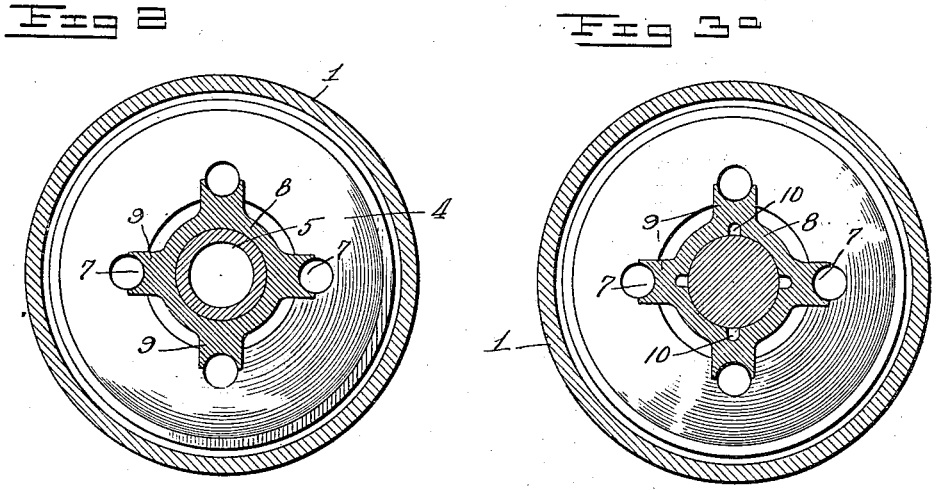
Witnesses
H. C. Polniette
S. V. Caffrey
Inventor
John J. Berrigan
By K. P. McElroy
Attorney J. J. BERRIGAN.
LIQUID SEPARATOR.
APPLICATION FILED NOV. 30, 1912.
1,087,568.
Patented Feb. 17, 1914.
2 SHEETS—SHEET 2.
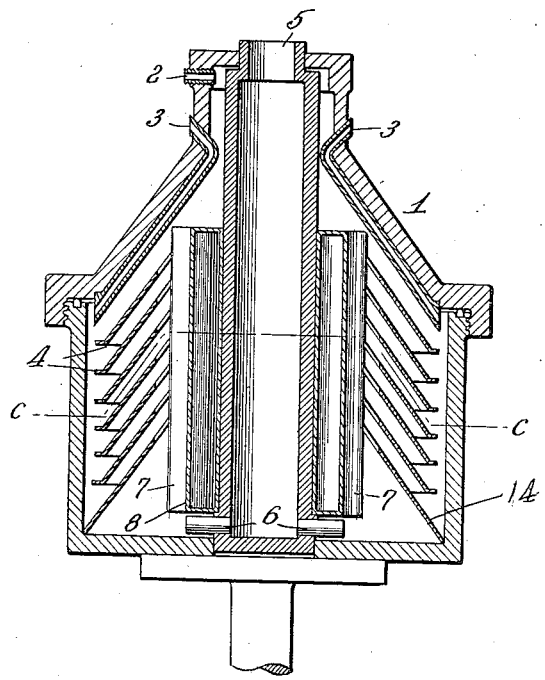
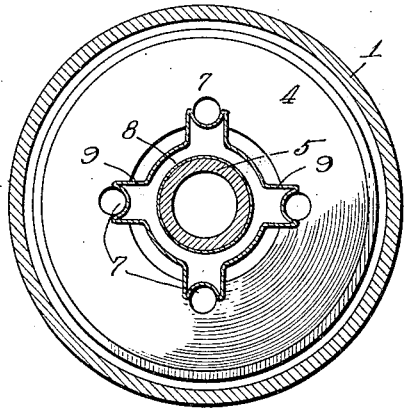
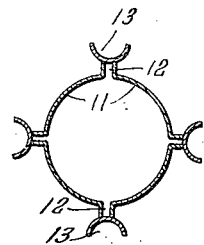
Witnesses
H. C. Schuette
S. V. Caffrey
Inventor
John J. Berrigan
By K. P. McElroy
Attorney

UNITED STATES PATENT OFFICE.

JOHN J. BERRIGAN, OF ORANGE, NEW JERSEY, ASSIGNOR TO WILLIAM GALLOWAY COMPANY, OF WATERLOO, IOWA, A CORPORATION OF DELAWARE.

LIQUID-SEPARATOR.

1,087,568.

Specification of Letters Patent. Patented Feb. 17, 1914.

Application filed November 30, 1912. Serial No. 734,329.

*To all whom it may concern:*

Be it known that I, JOHN J. BERRIGAN, a citizen of the United States, residing at Orange, in the county of Essex and State of New Jersey, have invented certain new and useful Improvements in Liquid Separators, of which the following is a specification.

This invention relates to liquid separators; and it comprises a centrifugal cream separator or liquid separator having a bowl provided with milk and cream outlets, a full milk inlet and a liner adapted to subdivide the contents of the bowl into thin layers, laminæ or strata crossing the radial lines of the bowl, such as a series of nested and spaced truncated cones or plates assembled around an axial milk inlet tube and means comprising a continuous open-topped troughlike or arcuate conduit establishing free communication between the means for delivering full milk to one end of the bowl and the end at which full milk is delivered from which cream and blue milk find exit, such conduit being located at a point radially well beyond the axis and having its open side presented toward the periphery; all as more fully hereinafter set forth and as claimed.

Centrifugal cream separators are usually provided with some form of liner consisting of nested and spaced plates or disks crossing and intersecting the radial lines of the bowl and therefore dividing the contained milk into thin layers or strata. In each of these milk layers separation takes place while the presence of the plates prevents cross-currents tending to remixture of separated material; and the use of a liner therefore adds materially to the efficiency of the machine. One common form of liner is given by spaced truncated cones nested around a central or axial inlet tube for whole or full milk; and it is to this type that the present invention particularly relates though it may be used with other types. With a bowl having this kind of liner, ordinarily the separated cream and skim milk, or blue milk, are both discharged near one end, usually the top, so that, considering the contents of the bowl as a whole, there is a steady progression or flow upward, the heavier blue milk ascending along the inner wall of the bowl while the cream ascends along a line nearer the axis. To accommodate these currents, the truncated cones usually stop somewhat short of the inner wall of the bowl and of the axial milk tube to provide vertical channels. The operation of this device depends very largely on the type of feed. If the feed of full milk be at a point below the nested plates, an initial separation is there effected into blue milk and cream which both begin to ascend in their respective channels. During this upward flow a perfecting separation occurs in the chambers between the nested plates or cones, the cream stream parting with more milk and the blue milk parting with some retained cream, the newly separated portions flowing as opposed countercurrents in the thin milk layers between the cones; and a further separation being effected during such flow. Obviously this is not taking full advantage of the separating powers of the liner since the bulk of the separation of the full milk is preliminarily effected below it; and many expedients have been proposed for a feed giving greater efficiency. One device is to abandon a bottom feed altogether and supply the whole milk portionwise into each of the spaces or milk layers between the plates, the feed being by a radial discharge from suitable orifices located at points intermediate radially between the lines of upward flow of blue milk and cream; at points where the average composition in the layer is not far different from that of the whole milk fed in. Ordinarily the central milk tube is provided with radial, orificed prolongations of some kind extending into the "neutral zone" through which the milk is discharged. This expedient increases the efficiency of the machine since all the layers between the plates operate in separating full milk, full milk being fed into each, but it involves certain disadvantages. One is that the forcible radial discharge of jets of milk from the orifices into the layers between the plates tends to disturb the quiet actions there going on; and another is that it interferes with and tends to abolish what is, so to speak, the natural action of the bowl in the stated perfecting separation; in the interchange of components through the layers between the vertical blue milk stream and the cream stream. The portion of whole milk, for example, which is discharged between the uppermost pair of plates is subjected to but one separation while its discharge as a jet interferes with the lateral cream and blue milk currents from the after separation going on in the ascending currents from the preliminary separation below; that is, with the lateral currents which should naturally flow through that layer from and between the ascending peripheral and axial currents.

It is an object of the present invention to devise means whereby the natural operation of the liner will be perfected and made automatic; and to this end in lieu of giving a forced radial jet feed through contracted orifices of the full milk from the axial milk tube outward, I supply the whole milk to the base of the machine and allow streams of such full milk to flow upwardly as far as they will through the series of disks and along open trough-like channels or arcuate plates located at points radially beyond the cream zone; such streams being fed directly to such channels. These channels allow the milk streams unrestricted communication with the outward blue milk zone but cut them off from the inward cream zone; and from their location, the whole milk streams can flow as such upwardly a considerable distance. At their upper ends the channels are not closed off or obstructed. Looked at in another way, there is a continuous vertical series of perforations or notches in the plates at a point well removed from the cream zone and basally open to the full milk flow, the space between each pair of plates being blocked off at this point by an arcuate shaped piece of metal with the reëntrant side facing the periphery. Simple notches or holes in the plates, without this arcuate strip between them, will not operate since they give an opportunity for "wild" currents. With a feed of this type, the whole milk flows upwardly along the arcuate plates for some distance (a distance varying with the feed and other conditions) and enters and feeds a plurality of the thin strata of milk. As it passes upward it becomes less and less in amount and is replaced by intercepted cream particles which form an increasing current back of it so that the discharge at the upper end of the channels through the topmost disk or cone is largely cream which goes to the cream wall. Since the open side of the channel faces outwardly, blue milk traveling radially does not enter it; and since it is at a point removed from the axis, cream from the axial cream flow does not gain access. The operation is largely automatic, lower layers deriving full milk from the flow as far upwardly as it is needed while the upper layers with the aid of which the perfecting after separation should take place, are not interfered with. The device will therefore give a richer or "denser" cream than devices in which there is a feed of whole milk into each of the interplate layers. The device may be applied to existing separators having a radial feed by blocking off such feed with arcuate strips of sheet metal and opening unrestricted communication of the channels so formed with the bottom and top of the bowl; that is below the bottommost and above the topmost disk or cone.

In the accompanying illustration I have shown, more or less diagrammatically, several embodiments of the described invention.

In this showing, Figure 1 is a vertical section of a cream separator comprising the new invention; Fig. 2 is a partial vertical section on lines B—B of Fig. 1; Fig. 3 is a fragmentary vertical section of a modification; Fig. 3ª is a horizontal section on Fig. 3; Fig. 4 is a similar view of another modification; Fig. 5 is a horizontal section on lines C—C of Fig. 4; and Fig. 6 is a fragmentary view showing the new invention applied to existing forms of separators having a radial discharge.

In this showing, element 1 represents a bowl provided with the usual cream screw 2, milk outlet 3, and truncated separator cones or plates 4. Axial inlet tube 5 in Fig. 1 is shown continued to the bottom and seated therein. It is provided with a plurality of radially presented outlet pipes or tubular conduits 6, each carried out beyond the cream line A—A and terminating below certain arcuate channels 7 (see Fig. 2). Around the axial tube is a jacket 8, shown in Fig. 1 as solid metal. This jacket is provided with ribs or prolongations 9 carrying the arcuate channels. The channels are continued above the uppermost plate of the nested series and open freely into the upper part of the bowl. Between the ribs space is afforded for a vertical channel 9ª for upward flow of cream, this channel being nearer the axis than the arcuate channels. The structure in Fig. 3 is the same as in Fig. 2, save in lieu of continuing the axial milk channel to the bottom of the bowl and providing special outlets for it, the milk is led to the bottom of the bowl through a tubular conduit or channel 10 in the jacket itself, this channel 10 being continued radially as before but terminated immediately below the arcuate channels (7). In Fig. 4 the jacket is shown as being sheet metal closed at bottom and top. This is lighter and cheaper than a solid metal jacket. The space within the jacket has no function in the present invention. The jacket in these views is shaped to have the same exterior contour as that of Figs. 1 and 2.

Fig. 6 shows the application of the present invention to the existing type of cream separators having a radial discharge of milk into the milk layers. In this view elements 11 together form the axial milk inlet. These elements are provided with lugs which form between them slit-like milk orifices 12 extending to deliver full milk radially and portionwise in all the spaces between the plates. This existing type is modified by adding an arcuate channel 13 over and closing each of these radial passages 12. The radial passages being closed, the milk is taken to the bottom of the bowl and flows thence upwardy outside the axial inlet tube along the channels 13.

The operation of the present structure is obvious from the foregoing description. Full milk being let in through 5 passes through 6 to a point immediately below channels 7. It rises through these channels which are located at a point radially well beyond cream channels 9ᵃ. Any slime that may separate is caught by slime collector 14. The milk separates more or less beneath the bottommost plate 4ᵃ, and blue milk flows peripherally while the cream passes upward and inward to the cream channel. Whole milk is fed beyond this first plate into the space formed by plate 4ᵇ where separation is also effected, the blue milk and cream flowing as before. More or less whole milk is also discharged, ordinarily, into the space formed by plate 4ᶜ where separation is also effected. Some milk may be fed into the next two or three strata above. The uppermost strata however act more as perfecting or after separators, giving an opportunity for cream from the blue milk stream to rejoin the main cream stream flowing up through 9ᵃ while, on the other hand, blue milk separated from this cream stream is returned to the blue milk wall. The arcuate strip of metal which closes the space between adjacent plates to the rear of the feed effectually prevents cream from the cream stream getting into the upwardly flowing current through such channel. Any inwardly flowing cream which may be intercepted by the arcuate channel will pass behind the milk stream coming upwardly and will flow out at the top of the channel which is in unrestricted communication with the top of the bowl.

What I claim is:—

1. A liquid separator comprising a bowl provided with an axial milk inlet for delivering full milk to one end and with milk and cream outlets, a liner comprising a plurality of plates crossing the radial lines of the bowl and a continuous open topped arcuate channel leading from the point of full milk delivery at one end of the bowl to the other end past all said plates, said channel being in direct unrestricted communication with said inlet and having an open side presented to the periphery of the bowl and a closed side presented to the axis and located at a point radially well removed from the cream outlet.

2. A liquid separator comprising a bowl provided with an axial milk inlet for delivering full milk to one end and with milk and cream outlets, a liner comprising a plurality of cone plates crossing the radial lines of the bowl and a continuous open topped troughlike channel leading from the point of full milk delivery at one end to the other past all said plates, said channel having an open side presented to the periphery of the bowl and a closed side presented to the axis and located at a point radially well removed from the cream outlet.

3. A cream separator comprising a bowl having an axial milk inlet tube, tubular means for delivering whole milk from said inlet tube directly to a point at the base radially removed from the tube, a liner comprising a plurality of nested truncated cones grouped around said tube and a continuous, open-topped troughlike conduit leading upwardly past all said cones to an open communication with the space thereabove, the base of said conduit being located immediately above said point of delivery and said conduit having a closed side presented to the axis of said bowl and well removed therefrom.

4. In a cream separator device, a series of nested and spaced truncated cones provided with an arcuate channel leading upwardly past the series and having its closed side located at a point radially beyond the inner extension of such cones and its open peripherally presented side in free communication with the spaces between such cones, the top of said channel being open above the uppermost of said cones and the bottom being also freely open.

5. A cream separator comprising a bowl provided with cream and milk outlets near its top and an axial milk tube leading to its bottom, a corrugated metal jacket surrounding said tube, certain of the channels afforded by said corrugations being along lines radially farther removed from the axis than others, a liner of nested and spaced truncated cones surrounding said jacket and all recessed to afford vertical channels corresponding to those of said farther removed corrugations whereby unobstructed communication is afforded from bottom to top of the bowl through said channels and means for delivering the milk from said milk tubes at points immediately below the channels radially farther removed from the axis.

6. A cream separator comprising a bowl provided with a liner and an axial milk inlet tube, conduit means for transferring milk from said tube to points radially distant therefrom and arcuate channels freely open to the top and the bottom spaces of said bowl, the open side of said channels being next said liner and the bottoms of said channels being positioned immediately above the points of discharge of said conduit means.

7. A cream separator comprising a bowl, a liner therein, an axial milk tube, a corrugated metal jacket surrounding said tube and extending past said liner at top and bottom, the corrugations being such as to produce a plurality of arcuate vertical channels facing said liner at points radially well removed from the axis and conduit means leading milk from the axial tube to points of discharge immediately below said arcuate channels.

8. A cream separator comprising a bowl, a liner therein, an axial milk tube, a hollow metal jacket surrounding said tube and extending past said liner at top and bottom, said jacket carrying vertical arcuate freely open furrows on its outer surface, and radial milk supply tubes communicating with the axial tube and ending just below said furrows.

In testimony whereof I affix my signature in the presence of two subscribing witnesses.

JOHN J. BERRIGAN.

Witnesses:
BENJAMIN H. WILLIAMS,
JOHN B. BERRIGAN.